Jan. 13, 1931. J. R. MEAGHER 1,788,401
METHOD AND APPARATUS FOR CONTROLLING ELECTRIC CIRCUITS
Filed Oct. 6, 1925
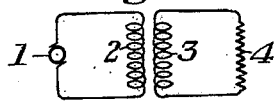
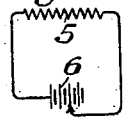
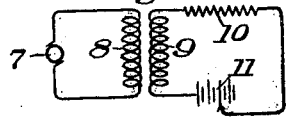
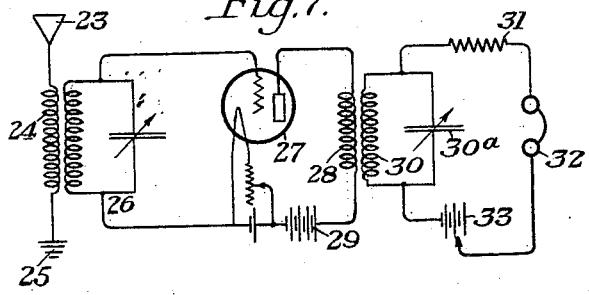
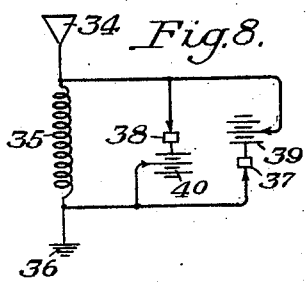
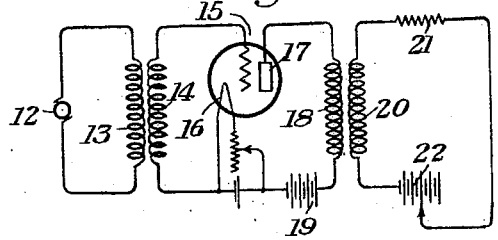
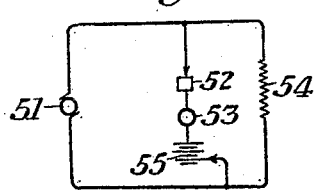
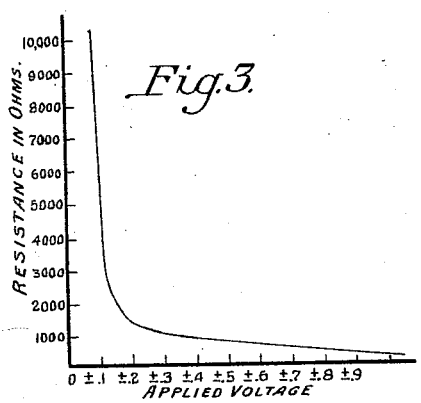
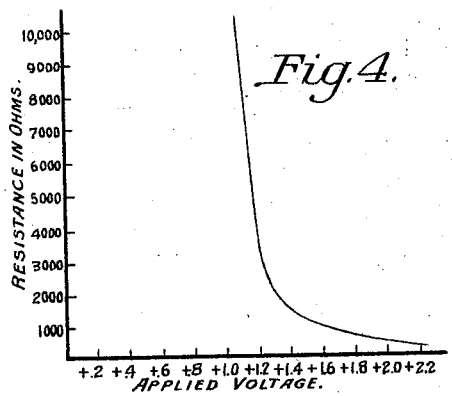
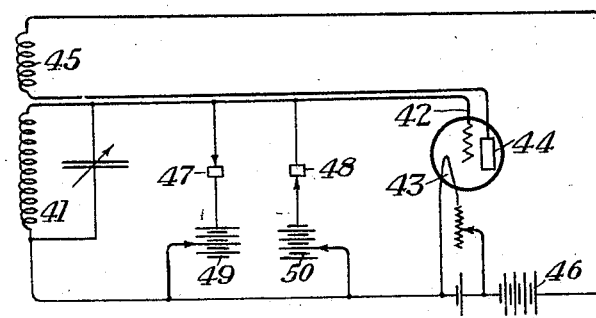
INVENTOR
John R. Meagher Patented Jan. 13, 1931

1,788,401

UNITED STATES PATENT OFFICE

JOHN R. MEAGHER, OF NIAGARA FALLS, NEW YORK, ASSIGNOR TO CARBORUNDUM COMPANY, OF NIAGARA FALLS, NEW YORK, A CORPORATION OF PENNSYLVANIA

METHOD AND APPARATUS FOR CONTROLLING ELECTRIC CIRCUITS

Application filed October 6, 1925. Serial No. 60,813.

This invention relates to electric circuits generally and particularly to a new and improved means for controlling and limiting the potential in electrical circuits.

The invention has for its principal object to provide a circuit and a method of regulating the circuit which embodies the use of an electrically adjustable resistance for controlling the potential in the circuit. The invention has for a further object to provide means for controlling the amplitude of oscillations in certain circuits, particularly resonant circuits and circuits embodying thermionic tubes.

According to the present invention it is proposed to use an electrically variable resistance as a controlling means for a circuit in place of mechanically adjustable means for controlling the circuit.

The invention may be readily understood by reference to the accompanying drawings in which:

Figure 1 is a diagrammatic view illustrating inductively connected circuits, this diagram being shown by way of illustration of the invention;

Figure 2 is a schematic view representing a simple circuit for electrically adjustable resistances;

Figures 3 and 4 are graphs illustrating the characteristic curves of typical electrically adjustable resistances;

Figure 5 is a simple circuit diagram combining the showing of Figure 1 with the showing of Figure 2 to illustrate the use of an electrically adjustable resistance in a circuit of the type shown in Figure 1;

Figure 6 is a wiring diagram of a thermionic tube circuit wherein an electrically variable resistance is used to inductively control the oscillation in the plate circuit of the tube;

Figure 7 is a view generally similar to Figure 6 illustrating the application of the principles of Figure 6 to a radio receiving circuit wherein the signal responsive element is included in series with the electrically variable resistance;

Figure 8 is a diagram illustrating the use of rectifying electrically adjustable resistances to limit the amplitude of the voltage across a given circuit;

Figure 9 is a diagram of a regenerative thermionic tube circuit employing electrically adjustable resistances in the grid circuit for controlling the oscillation of the thermionic tube;

Figure 10 is a diagram illustrating the use of an electrically variable resistance in combination with an indicator or meter.

In Figure 1 a source of alternating voltage 1 is connected to an inductance 2 which is coupled to the inductance 3 connected to the "load" resistance or impedance 4. For fixed values of 1, 2 and 3, the voltage across 3 will be greatest when the resistance 4 is infinitely high. Lowering the resistive value of 4 tends to decrease the voltage across 3. The extent of this tendency depends upon the design and manner of coupling between the inductances 2 and 3. If the transformer, 2, 3, has an open iron or air core, changes in the value of 4 will generally have a relatively great effect on the voltage across 3. Also, depending on the amount of power available at 1, and the manner of coupling 2, 3, changes in the value of 4 will tend to alter the voltage across 2. This voltage regulation through change in the value of load resistance is particularly evident in resonant electrical circuits wherein the voltage amplitudes may be relatively large but in which the amount of available power is small or limited. In order to control the amplitude of electromotive forces in electrical systems the load resistance 4 may be made adjustable. However, if, as may be desired or necessary, the resistance 4 should be adjustable from an infinitely hight to a definitely low value, considerable difficulty is experienced in the design of a mechanically adjustable resistance to cover such a wide ohmic range, or variable to the fine increments of adjustment sometimes necessary.

To obviate the necessity for a mechanically adjustable resistance in such voltage regulating systems, I propose the use of a resistance the value of which may be adjusted within very wide limits through electrical means.

Such resistances will hereinafter be termed electrically adjustable resistances.

In Figure 2, 5 represents an electrically adjustable resistance, the ohmic value of which depends upon the voltage of the biasing battery 6. In general, increase of voltage 6, decreases the resistance of 5. However, in some electrically adjustable resistances increase of the voltage 6 in a negative sense increases or does not affect the value of such resistances; though increase of voltage in the opposite or positive sense decreases resistive value. Such resistances are commonly termed rectifiers, and include the crystal, the electrolytic and the electron discharge types of rectifiers.

A graphic representation of the change in resistance with change in voltage of the biasing battery of a typical electrically adjustable resistance is shown in Figure 3. Voltage values are plotted horizontally and resistance values vertically. An example of this type of electrically adjustable resistance is found in some crystals of carborundum in contact with suitable conductors. The change in resistance of a typical rectifying electrically adjustable resistance with change in voltage of the biasing battery is shown in the curve of Figure 4. This is the general form of resistance change in such rectifying electrically adjustable resistances.

It is understood that the term electrically adjustable resistance includes any resistor or substance or device the ohmic value of which may be changed through change of the biasing voltage, either for all or at only certain ranges of applied voltage.

I propose the use of such electrically adjustable resistances to control, directly or indirectly, the amplitude of electromotive forces in electrical systems in this way. In Figure 5, a source of alternating electromotive force 7 is connected to an inductance 8 which is coupled to an inductance 9 connected to an electrically adjustable resistance 10 and the biasing battery 11. The voltage of the battery 11 is understood to be adjustable to any desired value, this being done in any known or preferred manner, as by an adjustable connection to a multiple cell battery, as diagrammatically indicated in the drawing. By changing the voltage 11, the value of the electrically adjustable resistance 10 may be changed within the limits, if any, of the device. By changing the value of the resistance 10, the effective alternating or pulsating voltage across the inductance 9 and the voltage across the inductance 8 may be regulated as desired between the highest possible and some lower value.

Thus by changing the value of the biasing voltage 11, the effective voltages from the source 7 may be controlled within certain limits, the extent of which depends upon the design and constants of the electrical system. An application of this method of voltage control is represented in the diagram of Figure 6. Here 12, a source of electromotive force is connected to an inductance 13, coupled to an inductance 14 which is connected to the grid 15 and filament 16 of an electron discharge amplifying device; the plate 17 is connected through the inductance 18 and the plate circuit battery 19 to the filament 16. An inductance 20, coupled to the plate circuit inductance 18, is connected to an electrically adjustable resistance 21 and a biasing battery 22.

The electron discharge device including the electrodes 15, 16, 17 together with its associated grid and plate circuits constitutes a relay that may be used for the purpose of amplification. There is, however, a tendency toward self-generation of oscillatory currents which interfere with good amplification. The action of self-generation in an electron discharge device is commonly termed oscillation or self-oscillation. In such an electron discharge amplifying system the tendency toward self-oscillation depends for one thing upon the value of the effective voltage across the plate coil 18. For a given value of coupling between the grid and plate circuits and for a given value of inductance 18, the tendency toward self-oscillation is greatest when the voltage across the plate circuit inductance 18 is highest; decrease of the voltage across the coil 18 diminishes the tendency to oscillate. Regulation of the voltage across 18 permits control of self-oscillation. Regulation of the voltage across the grid circuit inductance 14 also permits control of self-oscillation.

I provide means for regulation of the voltage across the plate coil 18, or the grid coil 14, or any associated circuits, through use of an electrically adjustable resistance suitably coupled or otherwise connected to the plate circuit inductance 18 or the grid circuit inductance 14 or to any associated circuit that will enable control, directly or indirectly, of self-oscillation of the electron discharge amplifying system. Thus, for instance in Figure 6, adjustment of the biasing voltage 22 so as to regulate the resistance of the electrically adjustable resistance 21, enables control of the effective voltage across the inductances 20 and 18. This control of the effective voltage across the inductance 18 enables control of self-oscillation of the electron discharge amplifying system.

If the electrically adjustable resistance 21 possesses the property of uni-lateral conductivity, the circuit 20, 21, 22 may be used for the dual purpose of rectification and self-oscillation control of an electron discharge amplifying system.

An arrangement of a vacuum tube amplifying system for use in radio reception is shown in Figure 7. Here the electrically adjustable resistance 31 may be a radio detector of the crystal, electrolytic or electron discharge type. In Figure 7, the antenna circuit 23, 24, 25 is coupled to the tuned grid circuit 26 which is connected to the grid and filament electrodes of the electron discharge amplifier 27. The plate electrode of the amplifier 27 is connected through the plate circuit inductance 28 and the plate circuit battery 29 to the filament. The plate circuit inductance 28 is coupled to the tuned circuit 30 which is connected to the electrically adjustable resistance 31, the indicating or current responsive device 32 and the adjustable biasing battery 33. The action of the circuit shown in Figure 7 may be explained in this way: Incoming radio frequency energy impressed on the antenna circuit 23, 24, 25 is transferred to the tuned grid circuit 26 and causes voltage variations between the grid and filament electrodes. In the generally understood manner, the grid voltage variations cause magnified plate voltage variations when the plate circuit inductance 28 is of a suitably high impedance for the frequency of the plate current variations.

In order to limit the value of the effective voltage across the plate inductance 28, the circuit 30, 31, 32, 33 is coupled to the coil 28. Through adjustment of the value of resistance 31 by means of the biasing voltage 33, the amount of energy absorbed from the plate circuit inductance 28 may be regulated. Consequently the effective voltage across the inductance 28 and the tendency toward self-oscillation may be controlled. In addition, the current induced in this circuit, 31—33, from the plate circuit inductance 28 may be rectified by the unidirectional resistance 31 and the resultant rectified current may be made to actuate a suitable indicating or other device 32.

The plain circuit 20, 21, 22 of Figure 6 and the modified circuit 30, 31, 32, 33 of Figure 7 or similar arrangements incorporating an electrically adjustable resistance may be used not only in conjunction with those electrical systems shown, but with any of the various electron discharge amplifying systems in which control of self-oscillation is desired. Thus the circuit 20, 21, 22 of Figure 6 may be coupled to a suitable grid or plate section of a "short wave" radio frequency amplifier; to the "intermediate frequency" amplifier of a super-heterodyne; to a plain regenerative amplifying detector; or to any form of reflex amplifier.

The inductance 20 or Figure 6 and the tuned circuit 30 of Figure 7 may be broadly or sharply tuned to the band of frequencies or particular frequency being used in the amplifier, by the use of suitable resonating devices, a variable condenser 30ª being indicated across coil 30 of Figure 7 for this purpose.

If desired or necessary more than one circuit such as 20, 21, 22 of Figure 6 or 30, 31, 32, 33 of Figure 7, may be coupled to the electron discharge amplifier to control self-oscillation.

If desired, two or more circuits such as 20, 21, 22 in Figure 6 and 30, 31, 32, 33 in Figure 7 may be coupled to the electron discharge amplifying system to control self-oscillation at more than one frequency.

Further I propose means for using rectifying electrically adjustable resistances as voltage limiting devices in electrical systems in this way: An inspection of the graph, Figure 4, shows that for the particular rectifier from which the measurements were secured the resistance is very high for all values of applied voltage less than positive 1. For applied voltages in excess of positive 1, the value of resistance is lower, being only 400 ohms at positive 2 volts. I will designate the value of voltage at which the resistance begins to decrease from its very high value as the critical voltage. It is evident that if a rectifying electrically adjustable resistance having the characteristic indicated in the graph, Figure 4, is connected across a circuit the voltage of which is less than positive 1 or less than the critical voltage of the rectifying resistance, or if the rectifying resistance is connected across the circuit in such a way that the applied voltage is in the negative sense so the resistance of the electrically adjustable rectifying resistance is very high, the presence of the electrically adjustable resistance will have a negligible effect upon the circuit; simply stated, as the resistance of the rectifying electrically adjustable resistance is infinitely high or practically so for all voltages negative or less than its critical voltage, its presence across any circuit in which the electromotive force is applied in the negative sense or in which the amplitude of the electromotive force does not exceed the critical voltage of the rectifying resistance will have little or no effect upon the circuit or action of the circuit. However, if the amplitude of the electromotive force across the circuit rises above the critical voltage of the rectifying resistance, the value of the latter will drop and it will then have some effect upon the circuit. The extent of this effect depends upon the design of the circuit, upon the characteristic of the rectifying electrically adjustable resistance and upon the amplitude of the applied voltage. As the critical voltage of a rectifying electrically adjustable resistance may be changed, in effect, through use of a suitable biasing voltage, it is possible to arrange the circuit so the rectifying electrically adjustable resistance will have little or no effect upon the circuit for electromotive forces of less than any desired amplitude. For voltages in excess of the desired value the rectifying electrically adjustable resistance will have an appreciable effect upon the circuit and may be used to limit the amplitude of electromotive force applied to the circuit. To limit the amplitude of electromotive force across the circuit in both the positive and negative direction, two or more rectifying electrically adjustable resistances may be connected in the circuit in the opposite direction.

A practical application of the use of rectifying electrically adjustable resistances to limit the amplitude of voltage across a circuit is represented in Figure 8. Here an antenna 34 is connected through a tuning inductance 35 to the ground 36. Radio frequency energy induced in the antenna will cause voltage alternations across the inductance 35. If it is desirable that the maximum amplitude of voltage across the inductance 35 should not exceed a certain value, two or more rectifying electrically adjustable resistances 37, and 38, may be connected across the inductance 35 with suitable biasing batteries 39 and 40 and so adjusted that they will have no appreciable effect upon the circuit when the voltage across the inductance 35 does not exceed the desired value. However, for voltages in excess of this value the resistance of the rectifying electrically adjustable resistances will be reduced and the resultant lowered resistance around the inductance 35 will cause a reduction or limitation in the amplitude of the voltage across the inductance 35.

Another practical application of the use of one or more rectifying electrically adjustable resistances to limit the amplitude of voltage across a circuit is represented in Figure 9. Here a tuned circuit 41 is connected to the grid 42 and filament 43 electrodes of an electron discharge amplifying device. The plate electrode 44 is connected through the plate circuit "feebback" coil 45 and the plate battery 46 to the filament 43. The tuned grid circuit 41 and the plate circuit coil 45 are coupled for the purpose of reinforcing the energy in the grid circuit. However, if too much electrical energy is transferred from the plate to grid circuits, the action commonly termed oscillation or self-oscillation will be set up. Self-oscillation may be obviated by limiting the voltage across the grid circuit. Two or more rectifying electrically adjustable resistances, 47, 48 together with suitable biasing batteries 49 and 50 may be used for the purpose of limiting the maximum value of voltage across the grid circuit.

It is understood that the use of rectifying electrically adjustable resistances need not be restricted to the particular arrangements and electrical circuits shown but may be employed wherever the circuit design permits of voltage limitation or regulation through the action of changing resistance.

Further I propose means for utilizing rectifying electrically adjustable resistances in combination with suitable indicating devices or electrical appliances to provide automatic actuation of said indicating or electrical appliances when the amplitude of voltage across an electrical circuit exceeds the critical voltage of said rectifying electrically adjustable resistances.

A practical application of the use of rectifying electrically adjustable resistances in combination with an indicating device is represented in the circuit of Figure 10. Here a source of electromotive force 51 is connected to a load resistance 54. If it is desired to have some indication when the amplitude of the electromotive force exceeds a certain value, a rectifying electrically adjustable resistance 52 and suitable biasing battery 55 in series with an indicating device 53 may be connected across the circuit and so adjusted that the resistance of 52 is very high for all voltages less than the desired value. When the amplitude of voltage exceeds this value, the resistance of the rectifying electrically adjustable device 52 will be decreased and electrical energy will pass through the circuit 51, 52, 53, 55. This energy may be used to operate the indicating device 53. If desired any other electrical device may be substituted for the indicator 53. More than one rectifying electrically adjustable resistance may be used if desired or necessary.

It is understood that rectifying electrically adjustable resistances may be used in combination with electrical appliances (to provide direct or indirect actuation of said appliances when the amplitude of voltage across which the combination is connected exceeds a certain value) not only in the single electrical system shown but in any electrical system in which the design permits of such connection.

I claim as my invention:

1. The combination of an electric circuit, arranged for the generation of self-sustained oscillations, of means included in the circuit for controlling the oscillations including a rectifier whose resistance is variable with a variation in the voltage across the terminals thereof, and means for applying a voltage across the terminals of said rectifier.

2. In combination with an electrical circuit having a thermionic tube for generating free oscillations in the circuit, of a control circuit associated therewith for altering the potential of the first circuit, said control circuit including an electrically variable resistance and a biasing source of electromotive force therefor.

3. In combination with an electric circuit including an inductance and a thermionic tube adapted to set up free oscillations in the circuit, of means coupled across the inductance for limiting the potential drop across said inductance to control oscillations in the circuit, said means including an electrically variable resistance.

4. The combination with an electric circuit having a thermionic tube arranged to generate self-sustained oscillations, of reversely arranged rectifying electrically variable resistances for controlling the amplitude of oscillation in said circuit.

5. The combination with a regenerative radio receiving circuit of an electrically adjustable resistance device for regulating the amplitude of the amplified voltage wave in said circuit for controlling the self-oscillation in said circuit.

6. In an electron valve tube circuit having a tendency toward free self-oscillation, an electro-variable resistance operatively coupled thereto, and a variable biasing electromotive force applied to said electro-variable resistance whereby the amplitude of self-oscillations in the tube circuit may be adjustably controlled.

7. The method of controlling self-oscillation in a thermionic tube circuit having a natural period which comprises utilizing the oscillations to vary an electro-variable resistance operatively interposed in the circuit, and applying a biasing voltage to said electro-variable resistance to control the point at which said electro-variable resistance becomes effective.

8. The method of controlling self-oscillation in a thermionic tube circuit having a natural period which comprises utilizing the oscillations to vary an electro-variable resistance operatively interposed in the circuit, applying a biasing voltage to said electro-variable resistance to control the point at which said electro-variable resistance becomes effective and manually varying the biasing voltage to selectively control the electro-variable resistance.

In testimony whereof I have hereunto set my hand.

JOHN R. MEAGHER.